(12) United States Patent
Tait

(10) Patent No.: US 10,556,558 B2
(45) Date of Patent: Feb. 11, 2020

(54) VEHICLE SEAT CONNECTION SYSTEM

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/116,058

(22) Filed: Aug. 29, 2018

(65) Prior Publication Data

US 2019/0061656 A1 Feb. 28, 2019

Related U.S. Application Data

(60) Provisional application No. 62/552,420, filed on Aug. 31, 2017.

(51) Int. Cl.
| | |
|---|---|
| *B60R 16/08* | (2006.01) |
| *B60N 2/90* | (2018.01) |
| *B60R 16/03* | (2006.01) |
| *B60N 2/02* | (2006.01) |

(52) U.S. Cl.
CPC .............. *B60R 16/08* (2013.01); *B60N 2/914* (2018.02); *B60N 2/99* (2018.02); *B60R 16/03* (2013.01); *B60N 2002/0264* (2013.01)

(58) Field of Classification Search
CPC ........... B60R 16/03; B60R 16/08; B60N 2/99; B60N 2/914; B60N 2002/0264
USPC ....................................................... 297/217.3
See application file for complete search history.

(56) References Cited

U.S. PATENT DOCUMENTS

| | | | |
|---|---|---|---|
| 6,429,544 B1 | 8/2002 | Sasaki | |
| 10,023,137 B2 * | 7/2018 | Chinavare | ........... B60R 16/0222 |

FOREIGN PATENT DOCUMENTS

| | | |
|---|---|---|
| JP | 2013082389 | 5/2013 |
| WO | 200042686 | 7/2000 |

* cited by examiner

*Primary Examiner* — Mark R Wendell
(74) *Attorney, Agent, or Firm* — Barnes & Thornburg LLP

(57) ABSTRACT

A vehicle seat may be used in a vehicle. The vehicle seat includes a frame for attachment to the vehicle and a seat module which secures to the frame to mount the seat module to the vehicle.

10 Claims, 4 Drawing Sheets

VEHICLE SEAT CONNECTION SYSTEM

PRIORITY CLAIM

This application claims priority under 35 U.S.C. § 119(e) to U.S. Provisional Application Ser. No. 62/552,420, filed Aug. 31, 2017, which is expressly incorporated by reference herein in its entirety.

BACKGROUND

The present disclosure relates to seats, and particularly to seats for use in vehicles. More particularly, the present disclosure relates to connection systems used in vehicle seats.

SUMMARY

According to the present disclosure, a vehicle seat may be used in a vehicle. The vehicle seat includes a frame for attachment to the vehicle and a seat module which secures to the frame to mount the seat module to the vehicle. The particular seat module may be a selected module from a group of various seat modules which may have different features, for example, to accommodate different types of drivers, vehicles, technologies, and/or the like.

In illustrative embodiments, the seat frame may define a mounting platform. The seat module includes a body adapted to mount on the mounting platform defined by the seat frame and defining a module surface for receiving the occupant in the seated position. The seat module may include at least one functional device using a utility service for operation. The vehicle seat may include a utility service connection system for providing connection to communicate at least two modes of utility service. The utility service connection system may include a unitary connector having at least one device-side communication line for communicating utility service with the at least one functional device and at least one vehicle-side communication line for communicating utility service with at least one utility server. The unitary connector may include a connector body having a male connector and a female connector for engagement together to communicate utility service. One of the male and female connectors may be attached with the seat frame. The male connector may include a first utility jack and a second utility jack and the female connector may include a first utility port formed complimentary to receive the first utility jack and a second utility port formed complimentary to receive the second utility jack. Connection of the first utility jack and the first utility port may communicate a first mode of utility service and connection of the second utility jack and the second utility port may communicate a second mode of utility service.

In illustrative embodiments, at least one of the two modes of utility service may be electrical. In some embodiments, at least one of the two modes of utility service may be pressurized fluid. In some embodiments, the first jack and second jack may have different shapes.

In illustrative embodiments, the unitary connector may include an additional jack and an addition port shaped complimentary to the additional jack. In some embodiments, the seat module may be one of a group of seat modules each selectively mountable onto the seat frame. In some embodiments, the at least one functional device may be a fluid bolster disposed in a wing of the seat module to selectively receive pressurized fluid for operation between inflated and deflated positions. The pressurized fluid is one of the modes of utility service. In some embodiments, the first mode of utility service may be provided to a first functional device of the at least one function device and the second mode of utility service may be provided to a second functional device of the at least one functional device. In some embodiments, the unitary connector may be secured to at least one of the seat module and the seat frame.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
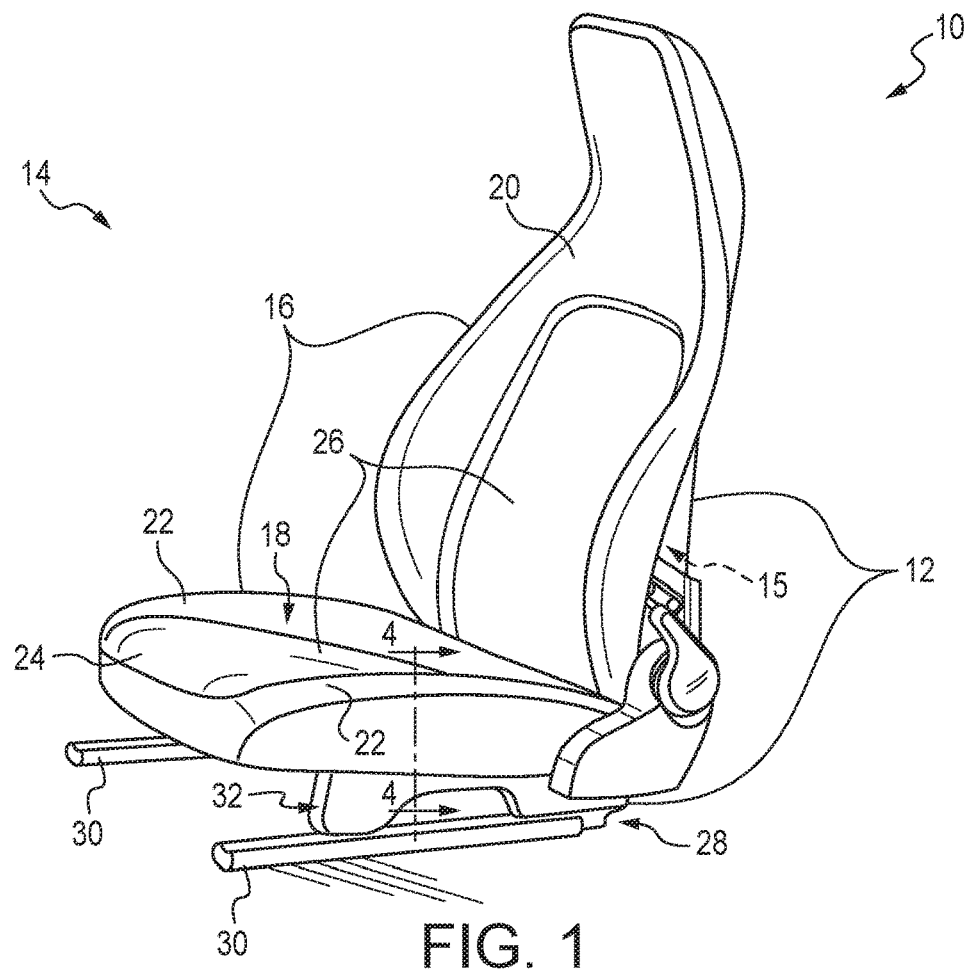
FIG. 1 is a perspective view of a view vehicle seat in accordance with the present disclosure.
Figure 2:
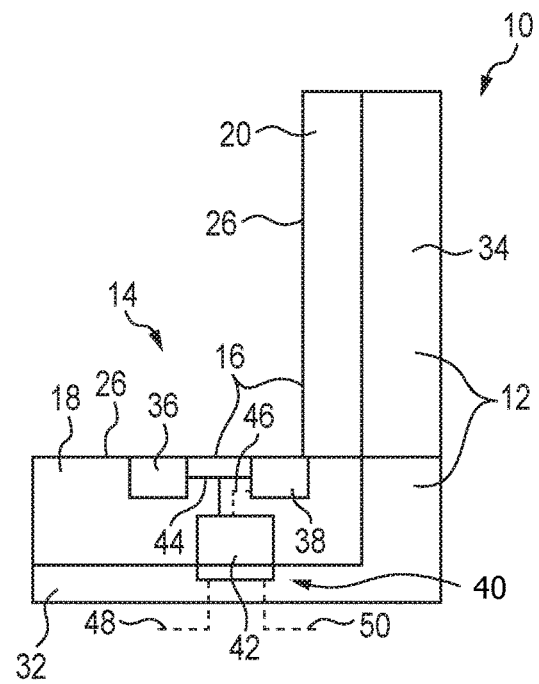
FIG. 2 is a diagrammatic elevation view of the vehicle seat of FIG. 1 showing certain internal features and showing that the vehicle seat includes a utility connection system for providing connection for communication of utility services.
Figure 3:
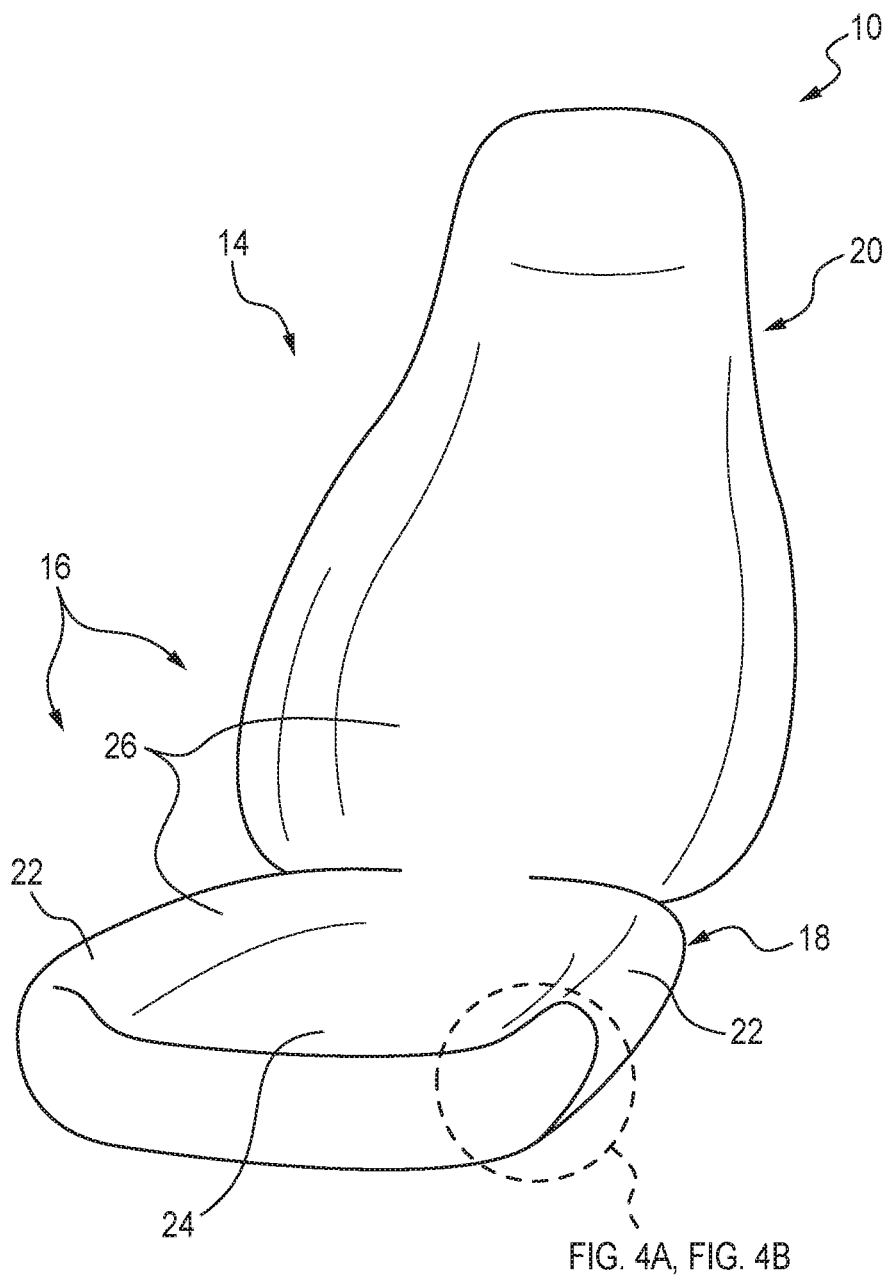
FIG. 3 is a perspective view of the vehicle seat of FIGS. 1 and 2 showing a zoom area for subsequent figures.
Figure 5A:
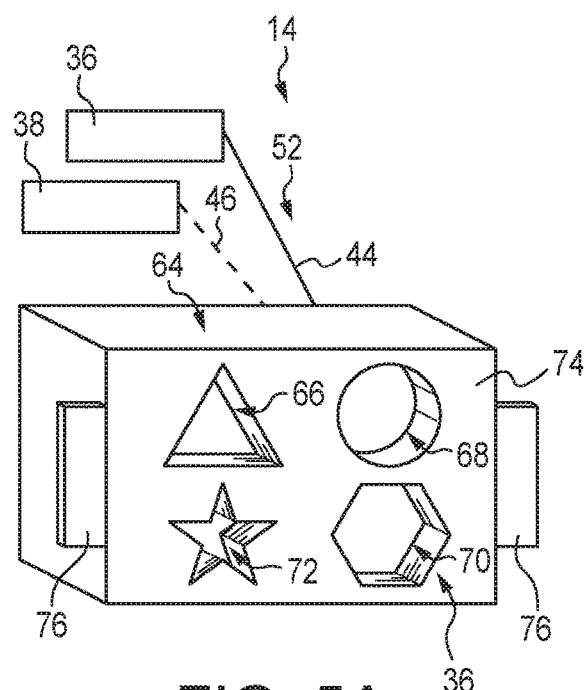
Figure 5B:
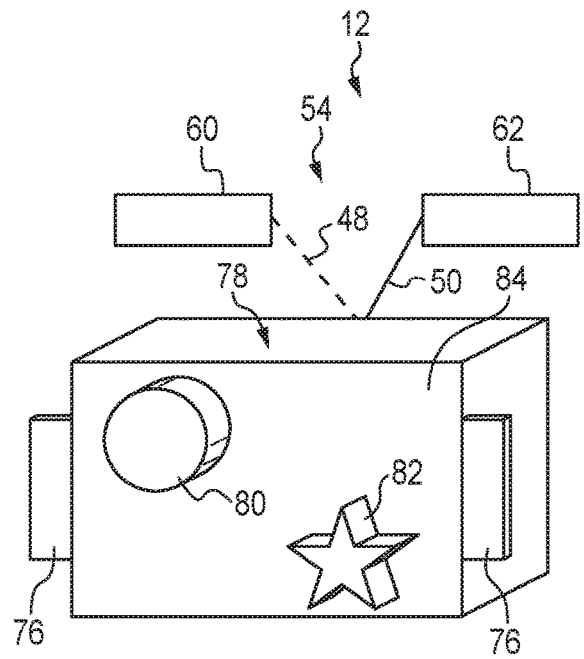
Figure 6A:
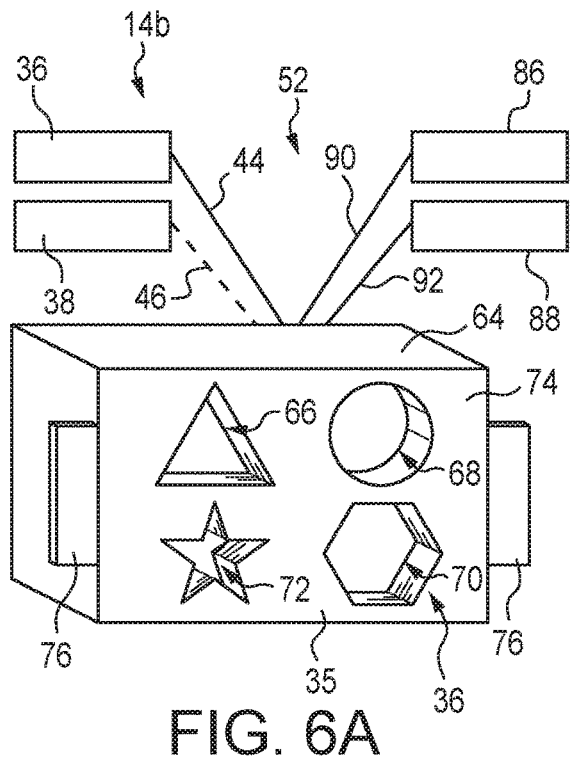
Figure 6B:
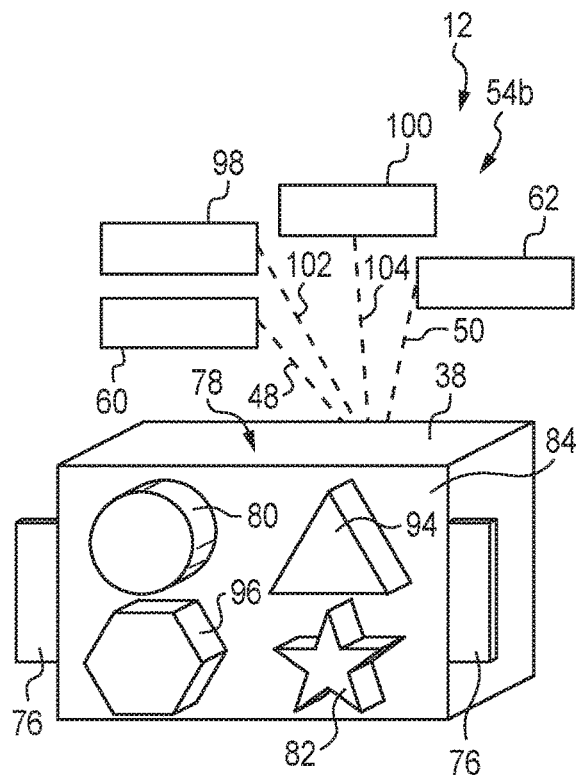

FIGS. 5A and 5B are perspective views of portions of a unitary connector of the utility connection system of the vehicle seat of FIGS. 1-3 having complimentary jacks and ports for different modes of utility service; and FIGS. 6A and 6B are perspective views of portions of another embodiment of a unitary connector of the utility connection system of the vehicle seat of FIGS. 1-3 having complimentary jacks and ports for different modes of utility service.

DETAILED DESCRIPTION

In the illustrative embodiment as represented in FIG. 1, a vehicle seat 10 is shown for use in a vehicle. The vehicle seat 10 illustratively includes a frame 12 for attachment to the vehicle and a seat module 14 which secures to the frame 12 to mount the seat module 14 to the vehicle. The particular seat module 14 may be a selected module from a group of various seat modules which may have different features, for example, to accommodate different types of drivers, vehicles, technologies, and/or the like.

The seat module 14 illustratively includes a body 16 including a base 18 for supporting an occupant's seated tail (bottom) and a backrest 20 projecting from the base 18 upwardly to support an occupant's seated torso (back). The backrest 20 may be adjustable in position relative to the base 18, for example, in projection angle or forward position, relative to the base 18. The base 18 illustratively includes side wings 22 having raised profile relative to a center portion 24 imparting overall curvature to the base 18, and the backrest 20 has similar corresponding arrangement. The body 16 defines a surface 26 formed of an exterior trim surface of the individual base 18 and backrest 20 for engagement with the occupant. As shown in FIG. 1, the frame 12 may include a rail system 28 having tracks 30 fixed to the vehicle and a carrier 32 attached with the seat module 14 and slidingly engaged with the tracks 30 to provide selective positioning of the seat module 14 along the tracks.

As shown diagrammatically in FIG. 2, the carrier 32 illustratively defines a mounting platform for connection of the seat module 14. The base 18 is selectively secured with the carrier 32. In the illustrative embodiment the frame 12 includes a back portion 34 extending from the carrier 32 that receives selective securing of the backrest 20 as a part of the mounting platform together with the carrier 32.

As shown in FIG. 2, the vehicle seat 10 illustratively includes functional devices 36, 38. In the illustrative embodiment, the functional device 36 is embodied as a power actuator configured to selectively adjust the position of the vehicle seat 10 (e.g., forward, backward, up and down, tilt of the base 18) using electric power as a mode of utility service, and the functional device 38 is embodied as a fluid bolster configured to selectively receive pressurized fluid as another mode of utility service to allow adjustment of the firmness and/or shape of the seat module 14. In the illustrative embodiment, the functional devices 36, 38 are disposed within the seat base 18, but in some embodiments, one or more functional devices may be arranged within the backrest 20, and/or external to the body 16. Although some functional devices, such as power actuators, may have active function, other functional devices may be passive, such as fluid bolsters and/or heating/cooling features receiving hot/cold fluid for the comfort of the occupant.

As a non-limiting example, different seat modules of the previously mentioned group of selectable seat modules may include fewer or greater number, different types, and/or different manner of functional devices. The vehicle seat 10 illustratively includes a utility service connection system 40 for providing connection to communicate utility services.

The utility service connection system 40 illustratively includes a unitary connector 42 providing connection of utility communication lines 44, 46, 48, 50. The communication lines 44, 46 are device-side communication lines which communicate utility services between the unitary connector 42 and the functional devices 36, 38. The communications lines 48, 50 are frame-side communication lines which communication utility services between utility service providers and the unitary connector 42. The unitary connector 42 provides a single interface for communicating connection of the communications lines to provide their utility service. For example, communication lines 44,48 are embodied as electrical service lines providing electrical power to the functional device 36, e.g., to power the power actuator, while communication lines 46, 50 are embodied as pressurized fluid lines providing pressurized fluid to the functional device 38, i.e., to pressurize the bolster. In some embodiments, communication lines may provide service to more than one functional device, as suggested by connection of the communication line 44 also with functional device 38 illustratively representing electrical control valve service within the pressurized bolster system.

Figure 4A:
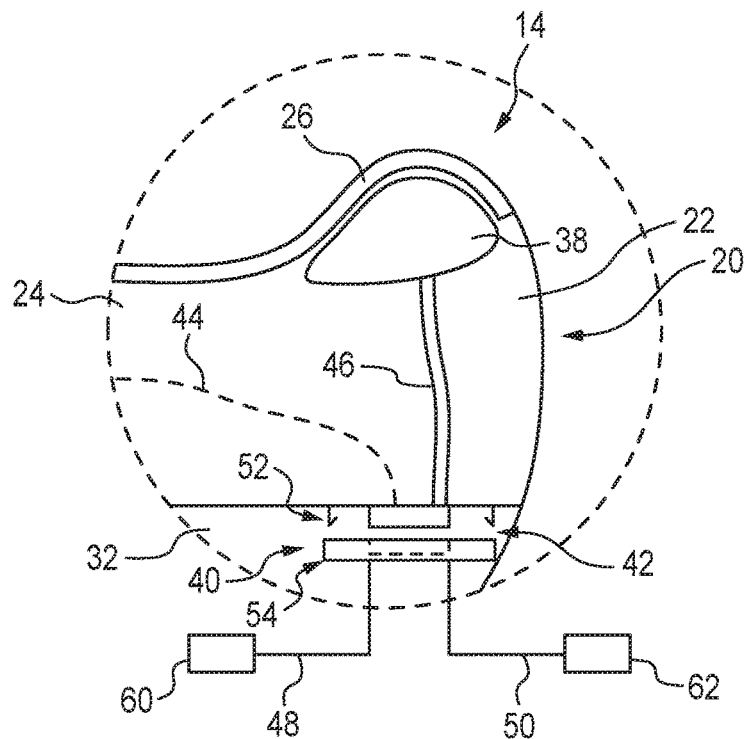
FIG. 4A is a sectional view taken along the line 4-4 in FIG. 1 and at the location as shown in FIG. 3 showing some internal portions of the vehicle seat.
Figure 4B:
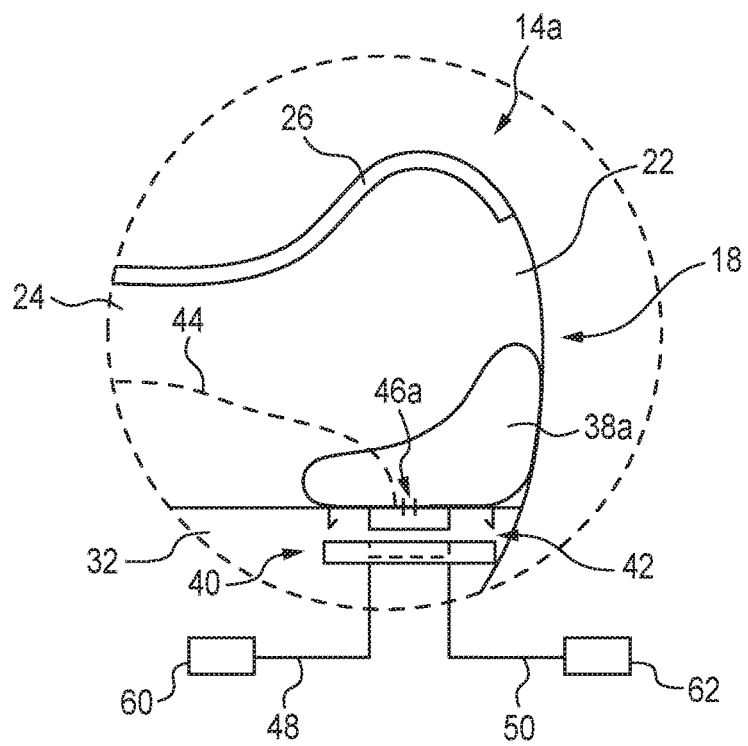
FIG. 4B is a view similar to FIG. 4A but showing a slightly different embodiment of some internal portions of the vehicle seat.

As shown in FIG. 3, a zoom location of the vehicle seat is shown in dashed circle to clarify the location of the cross-section of FIGS. 4A and 4B. As shown in FIG. 4A, the fluid bolster 38 is shown positioned within the wing 22 of the base 18 and defining the curvature of the exterior trim surface 26. The unitary connector 42 is shown near the connection of the base 18 with the carrier 32 of frame 12 having communication line 46 extending to communicate pressurized fluid to the fluid bolster 38.

The unitary connector 42 includes a module-side portion 52 and a frame-side portion 54 which, coupled together, form the unitary connector 42. The module-side portion 52 is illustratively secured with the seat module 14 to provide a simple and quick manner of connecting utility service with the seat module 14. The module-side portion 52 is illustratively arranged commonly throughout the group of seat modules, corresponding to the location of the frame-side portion 54, to allow easy configuration and coupling for utility service of any selected one of the group of seat modules with the frame 12.

As shown in FIG. 4A, the module-side portion 52 and frame-side portion 54 are selectively coupled together to communicate utility service, and are shown slightly separated for descriptive purposes. The module-side portion 52 remains fixedly connected with the communication lines 44, 46, while the frame-side portion 54 remains fixedly connected with the communication lines 48, 50. In the illustrative embodiment, the module-side portion 52 is mounted to the module 14 and the frame-side portion 54 is mounted to the frame 12. In some embodiments, the frame-side portion 54 may be mounted to the frame 12 or the module 14 and the, while the module-side portion 52 remains free from direct mounting; and in other embodiments, the frame-side portion 54 may remain free from mounting, while the module-side portion 52 is mounted to the module 14 or frame 12; and in still other embodiments, both the module-side portion 52 and the frame-side portion 54 remain free from direct mounting on either of the module 14 or frame 12. The communication lines 48, 50 are embodied as external utility service lines connecting to utility service providers 56, 58 embodied as an electrical power source 60 and pressurized fluid source 62 of the vehicle.

As shown in FIG. 4B, seat module 14 has been removed and another seat module 14a has been secured with the frame 12. The seat module 14a illustratively includes functional device 38a embodied as a pressurized bolster similar to the bolster of functional device 38, except arranged within the base 18 near the interface between the base 18 and the carrier 32. Accordingly, the communication line 46a is considerably shorter in comparison with communication line 46.

Referring now to FIGS. 5A and 5B, a closer view of each of the module-side portion 52 and frame-side portion 54 of the unitary connector 42. As shown in FIG. 5A, the module-side portion 52 is embodied as a female receiver having a body 64 defining ports 66, 68, 70, 72 in a face 74 thereof. In the illustrative embodiment, the port 68 is in communication with the communication line 44 and the port 72 is in communication with the communication line 46. Ports 66 and 70 are illustratively unused ports, representing a standard configuration of the unitary connector 42, for use in a variety of seat modules regardless of their required number of utility services. The module-side portion 52 includes attachment features 76 (which may comprise hooks) for securing connection with attachment features 76 of the frame-side portion 54 (which may comprise catches).

As shown in FIG. 5B, the frame-side portion 54 is embodied as a male insert having a body 78 including jacks 80, 82 projecting from a face 84 thereof. The jack 80 is in communication with the communication line 48 and is shaped complimentary with port 68 to allow connection of utility service to the functional device 36 upon reception of the jack 80 within the port 68. The jack 82 is in communication with the communication line 50 and is shaped complimentary with port 72 to allow connection of utility service to the functional device 38 upon reception of the jack 82 within the port 72. Connection of the frame-side portion 54 with the module-side portion 52 includes mating the faces 84, 74 (although not necessarily requiring contact between the faces 84, 74), and insertion of the jack 80 into the complimentary port 68 providing communication of utility service with communication line 44 and insertion of the jack 82 into the complimentary port 72 providing communication of utility service with communication line 46.

As shown in FIGS. 6A and 6B, a different seat module 14b of the group of seat modules has been selected still having the same type of module-side portion 52 of the unitary connector 42 but having additional ports 66, 70 connected in communication with corresponding additional functional devices 86, 88 via communication lines 90, 92. The different seat module 14b is mounted with the frame 12 having a frame-side portion 54b which includes additional jacks 94,96 complimentary for reception within ports 66, 70. The jacks 94, 96 are illustratively in communication with additional utility service providers 98, 100 of the vehicle via communication lines 102,104. Connection of the module-side portion 52 with the frame-side portion 54 to form the unitary connector 42 includes mating of the faces 74, 84 and insertion of the jacks 80, 82, 94, 96 within the ports 66, 68, 70, 72 to communicate utility service to the functional devices 36, 38, 86, 88.

In the illustrative embodiment of FIGS. 6A and 6B, the number of utility service providers corresponds with the number of jacks and ports, number of module-side and frame-side communication lines, and the number of functional devices. However, in some embodiments, any suitable number of any of the utility service providers, jacks and ports, and functional devices may be provided, such that functional devices may appropriately share communication lines, jacks and ports, and/or utility service providers to receive the same mode of utility service, and/or utility service providers may appropriately service the same communication lines, jacks and ports, and/or utility service providers to provide the same mode of utility service to certain functional devices. Moreover, in the present disclosure, different modes of utility service includes different utility services (i.e., electric vs. pressurized fluid), however, different communication lines may provide the same type of utility service, but having a different form, for example, different utility service providers and communication lines may provide electrical power having different voltages, and constitute different modes of utility service. For example, in addition to the electrical and pressurized fluid service providers 60,62 the additional service providers 98, 100 may provide electric power having different voltages from utility service provider 60. Accordingly, the different service providers 60, 62, 98, 100 can provide different modes of utility service and may provide more than one of the different modes of utility service to the same functional device via appropriate communication lines. Utility services may include electrical, fluid (e.g., pressurized, heated, cooled), data (electrical, optic, audio), and/or any other suitable utility service.

The particular complimentary shapes of the jacks and port as indicated in FIGS. 5A, 5B, 6A, and 6B are illustrative, and in some embodiments any suitable complimentary shapes may be applied. In some embodiments, the complimentary shapes of corresponding jacks and port are selected to be incompatible with the shapes of non-corresponding jacks and ports to discourage improper connection. In some embodiments, the unitary connector 42 may have any suitable number of complimentary jacks and ports. In some embodiments, the module-side portion may comprise the male insert and the frame-side portion may comprise the female receiver.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

Seats, and particularly vehicle seats, can have features which require supply of utility services, such as electrical power, that may come from existing utility suppliers of the vehicle, for example, the existing electric systems of the vehicle. With various seat configurations and/or utility needs, different types of seats may require different types of utility service.

The following numbered clauses include embodiments that are contemplated and non-limiting:

Clause 1. A vehicle seat for supporting an occupant in the seated position in a vehicle, the vehicle seat comprising a seat frame for securing with the vehicle, the seat frame defining a mounting platform.

Clause 2. The vehicle seat of clause 1, any other clause, or combination of clauses, furthering comprising a seat module including a body adapted for mounting on the mounting platform defined by the seat frame and defining a module surface for receiving the occupant in the seated position, Clause 3. The vehicle seat of clause 1, any other clause, or combination of clauses, wherein the seat module includes at least one functional device using a utility service for operation, Clause 4. The vehicle seat of clause 1, any other clause, or combination of clauses, further comprising a utility service connection system for providing connection to communicate at least two modes of utility service, the utility service connection system including a unitary connector having at least one device-side communication line for communicating utility service with the at least one functional device and at least one vehicle-side communication line for communicating utility service with at least one utility server.

Clause 5. The vehicle seat of clause 1, any other clause, or combination of clauses, wherein the unitary connector includes a connector body having a male connector and a female connector for engagement to communicate utility service.

Clause 6. The vehicle seat of clause 1, any other clause, or combination of clauses, wherein the male connector includes a first utility jack and a second utility jack.

Clause 7. The vehicle seat of clause 1, any other clause, or combination of clauses, wherein the female connector includes a first utility port formed complimentary to receive the first utility jack and a second utility port formed complimentary to receive the second utility jack.

Clause 8. The vehicle seat of clause 1, any other clause, or combination of clauses, wherein connection of the first utility jack and the first utility port communicates a first mode of utility service and connection of the second utility jack and the second utility port communicates a second mode of utility service.

Clause 9. The vehicle seat of clause 1, any other clause, or combination of clauses, wherein at least one of the two modes of utility service is electrical.

Clause 10. The vehicle seat of clause 1, any other clause, or combination of clauses, wherein at least one of the two modes of utility service is pressurized fluid.

Clause 11. The vehicle seat of clause 1, any other clause, or combination of clauses, wherein the first jack and second jack have different shapes.

Clause 12. The vehicle seat of clause 1, any other clause, or combination of clauses, wherein the unitary connector includes an additional jack and an addition port shaped complimentary to the additional jack.

Clause 13. The vehicle seat of clause 1, any other clause, or combination of clauses, wherein the seat module is one of a group of seat modules each selectively mountable onto the seat frame.

Clause 14. The vehicle seat of clause 1, any other clause, or combination of clauses, wherein the at least one functional device is a fluid bolster disposed in a wing of the seat module to selectively receive pressurized fluid for operation between inflated and deflated positions.

Clause 15. The vehicle seat of clause 1, any other clause, or combination of clauses, wherein pressurized fluid is one of the modes of utility service.

Clause 16. The vehicle seat of clause 1, any other clause, or combination of clauses, wherein the first mode of utility service is provided to a first functional device of the at least one function device and the second mode of utility service is provided to a second functional device of the at least one functional device.

Clause 17. The vehicle seat of clause 1, any other clause, or combination of clauses, wherein the unitary connector is secured to at least one of the seat module and the seat frame.

The invention claimed is:

1. A vehicle seat for supporting an occupant in the seated position in a vehicle, the vehicle seat comprising
a seat frame for securing with the vehicle, the seat frame defining a mounting platform,
a seat module including a body adapted for mounting on the mounting platform and defining a module surface for receiving the occupant in the seated position, the seat module including at least one functional device using a utility service for operation, and
a utility service connection system for providing connection to communicate at least two modes of utility service, the utility service connection system including a unitary connector having at least one device-side communication line for communicating utility service with the at least one functional device and at least one vehicle-side communication line for communicating utility service with at least one utility server, the unitary connector includes a connector body having a male connector and a female connector for engagement to communicate utility service,
wherein the male connector includes a first utility jack and a second utility jack and the female connector including a first utility port formed complimentary to receive the first utility jack and a second utility port formed complimentary to receive the second utility jack, wherein connection of the first utility jack and the first utility port communicates a first mode of utility service and connection of the second utility jack and the second utility port communicates a second mode of utility service.

2. The vehicle seat of claim 1, wherein at least one of the two modes of utility service is electrical.

3. The vehicle seat of claim 1, wherein at least one of the two modes of utility service is pressurized fluid.

4. The vehicle seat of claim 1, wherein the first jack and second jack have different shapes.

5. The vehicle seat of claim 1, wherein the unitary connector includes an additional jack and an addition port shaped complimentary to the additional jack.

6. The vehicle seat of claim 1, wherein the seat module is one of a group of seat modules each selectively mountable onto the seat frame.

7. The vehicle seat of claim 1, wherein the at least one functional device is a fluid bolster disposed in a wing of the seat module to selectively receive pressurized fluid for operation between inflated and deflated positions.

8. The vehicle seat of claim 7, wherein pressurized fluid is one of the modes of utility service.

9. The vehicle seat of claim 1, wherein the first mode of utility service is provided to a first functional device of the at least one function device and the second mode of utility service is provided to a second functional device of the at least one functional device.

10. The vehicle seat of claim 1, wherein the unitary connector is secured to at least one of the seat module and the seat frame.

* * * * *